J. C. LAMB.
WHEEL BEARING.
APPLICATION FILED NOV. 19, 1917.
1,324,911. Patented Dec. 16, 1919.
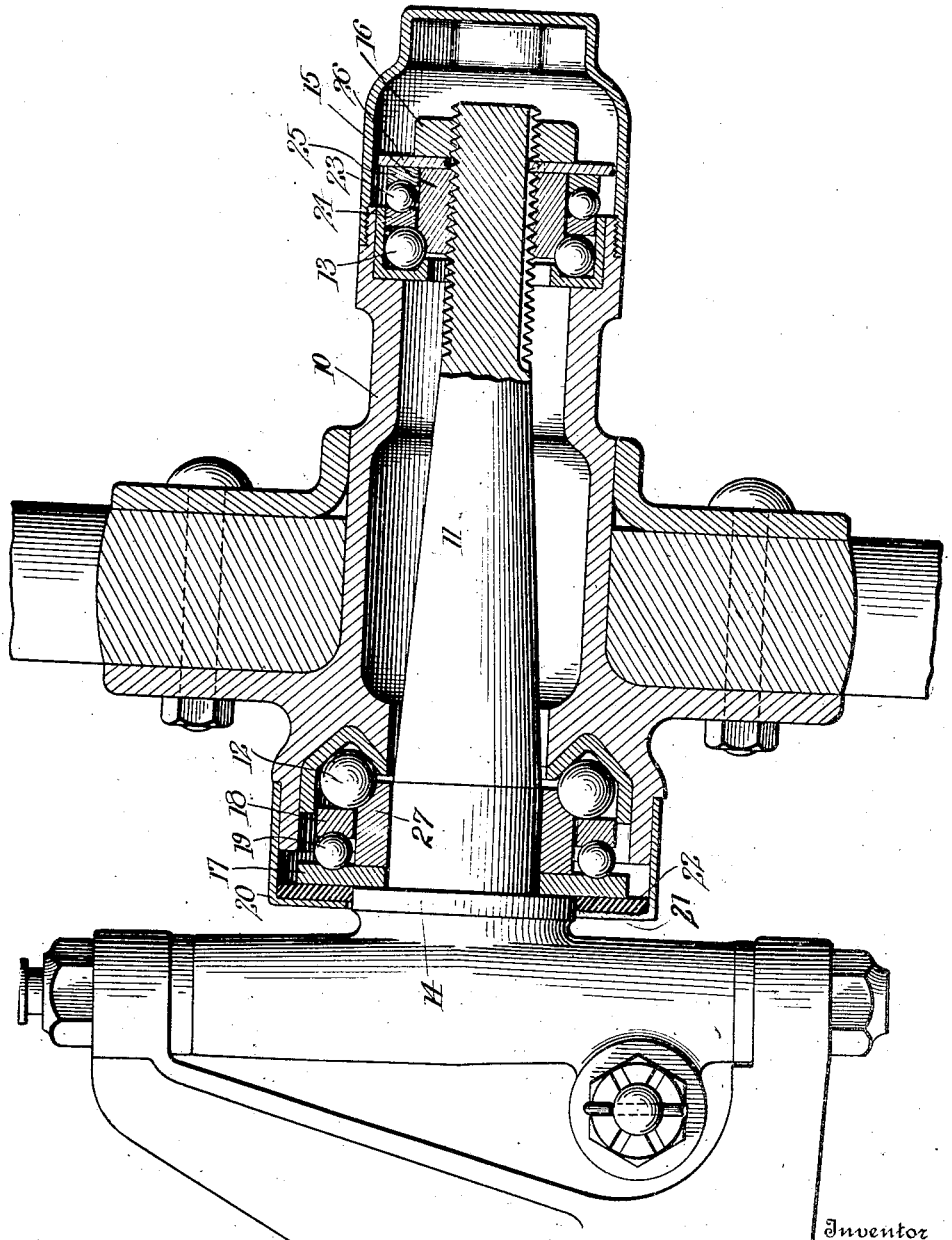

UNITED STATES PATENT OFFICE.

JOHN CLINTON LAMB, OF CHARLESTON, SOUTH CAROLINA, ASSIGNOR OF ONE-HALF TO GEORGE R. FISHBURNE, OF CHARLESTON, SOUTH CAROLINA.

WHEEL-BEARING.

1,324,911.   Specification of Letters Patent.   Patented Dec. 16, 1919.

Application filed November 19, 1917. Serial No. 202,813.

*To all whom it may concern:*

Be it known that I, JOHN C. LAMB, a citizen of the United States, and residing at Charleston, Charleston county, State of South Carolina, have invented certain new and useful Improvements in Wheel-Bearings, of which the following is a specification.

The present invention relates to wheel bearings and more particularly to auxiliary bearings adapted to be added to the front wheels of motor vehicles of the Ford or Chevrolet types without altering their structure.

It is the principal object of this invention to provide auxiliary bearings which may be added to the wheels of motor vehicles of the types mentioned without altering the original construction and which will prevent or reduce the liability to wear and deformation incident to these bearings.

Other objects and features of the invention will be apparent from the description taken in connection with the drawing.

In the single figure of the drawing which is a sectional elevation I have illustrated a portion of a front wheel of the type used in Ford or Chevrolet motor vehicles. This wheel comprises a hub 10 which is rotatively supported on the spindle 11 by means of two ball bearings 12 and 13. The inner bearing 12 includes a cone 27 which is removably mounted on the spindle and held against inward movement by means of the shoulder 14 formed on the spindle. The other ball bearing 13 includes a cone 15 which is threaded on the end of the spindle and is locked against displacement by a lock nut 16.

My invention consists in the addition to the above described structure of two auxiliary bearings which may be installed without altering the said structure. As shown I provide an auxiliary inner thrust bearing which is arranged around the inner cone 27. This auxiliary bearing comprises a race ring 17 which has a portion extending between the cone 27 and the shoulder 14, and a second race ring 18 which is interposed between the balls of the bearing 12 and the balls 19 of the auxiliary thrust bearing. The dimensions of this latter bearing may be such as to supplement the action of the main bearing 12 as soon as installed, or preferably, they are made such that the bearing comes into action only after a slight wear of the cone 27. For the purpose of preventing ingress of dust, etc., to these bearings, I provide a cap 20 which is carried by the inner end of the hub 10 and has a radial inwardly extending flange 21 between which and the race ring 19 is interposed a felt washer 22.

The second auxiliary bearing which is arranged at the outer end of the spindle and hub comprises a series of balls 23 which is interposed between the race rings 24 and 25, all of these parts being arranged around the cone 15. A washer 26 is interposed between the lock nut 16 and the cone 15 and affords an abutment for the race ring 25. Thus the whole thrust bearing is arranged around the cone 15 and interposed between the balls of the bearing 13 and washer 26. The dimensions of this thrust bearing are such that it takes up the end thrust of the wheel hub, and preferably comes into action immediately after a slight wear of the cone 15.

In installing my improvement in a wheel of the type described, the wheel is taken off the spindle and the spindle demounted from the axle. Then the wheel is laid down flat with the inner end of the hub uppermost so that the balls of the bearing 12 may be arranged at the said inner end. The race ring 18 and balls 19 are then placed in position; the dust cap with its felt washer, the race ring 17 and cone 27 are positioned on the spindle in the order named, and the spindle inserted in the hub. If the thrust bearing is of the assembled or self-contained type it goes with the race ring 17. The wheel with the spindle therein is thereupon inverted and the bearings at the outer end of the spindle and hub placed in position. This is done by inserting the balls of the bearings 13, screwing up the cone 15, inserting the auxiliary thrust bearing, then the washer 26 and finally screwing up the lock nuts 16 to clamp the washer between the same and the cone.

From the foregoing it will be apparent that I have provided an exceedingly simple means for practically eliminating the wear in the bearings of wheels of the type mentioned, which may be sold at a reasonable price. Furthermore, the bearings may be installed by a layman without in any way altering the structure of the wheel as purchased. It will be apparent that as soon as the original bearings of the wheel begin to wear, my auxiliary bearings take substantially all the longitudinal thrust loads leaving only the radial loads to come on the original bearings, thereby saving the original bearings from excessive wear. It is found that a wheel equipped with my auxiliary bearings will run indefinitely without requiring adjustment and much less any replacement of parts.

Having thus described the invention what is claimed as new and desired to be secured by Letters Patent is:

1. In a wheel construction the combination with a hub of a spindle extending therethrough, a main roller bearing between said hub and spindle near each end adapted to take radial load and end thrust, and a removable supplemental bearing surrounding said spindle at each end on the outer side of the main bearing and adapted to take end thrust from the balls of said main bearing.

2. The combination with a motor vehicle front wheel bearing of the type including two ball bearings, one having a cone on the spindle at the inner end of the wheel hub held against inward movement by a shoulder on the spindle and the other a cone threaded on the spindle at the outer end of the hub and secured by a lock nut; of a pair of auxiliary roller bearings, one arranged around the inner cone and having a race ring extending between the said cone and shoulder and the other arranged around the outer cone.

3. The combination with a motor vehicle front wheel bearing of the type including two ball bearings, one having a cone on the spindle at the inner end of the wheel hub held against inward movement by a shoulder on the spindle and the other cone threaded on the spindle at the outer end of the hub and secured by a lock nut; of a pair of auxiliary roller bearings, one arranged around the inner cone and having a race ring extending between the said cone and shoulder and the other arranged around the outer cone, and having a race ring extending between said outer cone and lock nut.

4. The combination with a motor vehicle front wheel bearing of the type including two ball bearings, one having a cone on the spindle at the inner end of the wheel hub and the other a cone on the spindle at the outer end of the hub held against movement by a lock nut; of a pair of auxiliary roller bearings, one arranged around the inner cone and the other about the outer cone, said latter bearing including a race ring extending between the outer cone and lock nut.

5. The combination with a complete and operative wheel hub construction of the type embodying a hub, a spindle extending therethrough, a main ball bearing so mounted between said hub and spindle near each end as to take radial load and end thrust, of a supplemental end thrust ball bearing removably secured around said spindle at each end outside of the main bearing and so arranged as to take end thrust from the balls of the main bearing.

6. In a wheel construction the combination with a hub of a spindle extending therethrough, a self-contained ball bearing between said hub and spindle near the end adapted to take radial load and end thrust, and a removable supplemental end thrust bearing composed of two race rings and interposed balls fitting over the end of said spindle, one of said race rings being adapted to make contact with the balls of the first mentioned bearing.

7. In a wheel construction the combination with a hub of a spindle extending therethrough, a ball bearing near the ends of said parts comprising a raceway in the hub and a ring raceway on the spindle and a series of balls held by and between said raceway and a removable supplemental end thrust ball bearing having a loose race ring fitting over the race ring on said spindle and adapted to bear against the balls of said first mentioned bearing, and means for securing the outer race ring on said supplemental bearing in place.

8. In a wheel construction the combination with a hub of a spindle extending therethrough, a main ball bearing between said hub and spindle near the end adapted to take radial load and end thrust in one direction, and a removable supplemental end thrust ball bearing removably secured in place around said spindle on that side of the main bearing nearest the end of the spindle and adapted to receive end thrust from the balls of the main bearing.

In testimony whereof I affix my signature.

JOHN CLINTON LAMB.